Patented Jan. 2, 1951

2,536,734

UNITED STATES PATENT OFFICE 2,536,734

CATAPHORETIC DEPOSITION OF BORON

Oliver Flint, Strand, London, England

No Drawing. Application November 14, 1949, Serial No. 127,263. In Great Britain November 29, 1948

20 Claims. (Cl. 204—181)

The invention relates to the production of boron coatings on electrically-conducting surfaces and particularly on metal surfaces.

The object of the invention is to provide a simple and effective method of applying coatings of boron to electrically conducting surfaces, whereby thickness of coating may be controlled.

According to the invention boron is deposited cataphoretically on an electrically conducting surface from a suspension of finely divided boron, preferably of particle size up to 10 microns, in a medium comprising a cellulose derivative as dispersion agent for the boron and a solvent for the cellulose derivative.

Also in accordance with the invention a fluid composition for the cataphoretic deposition of boron comprises finely divided boron in suspension in a medium comprising a cellulose derivative and a solvent therefor.

Boron may be present in quantity of from 2 per cent. to 20 per cent. of the total composition of the suspension and preferably in quantity of substantially 10 per cent. The cellulose derivative may be employed in amounts from 0.5 to 10 per cent. of the total composition, the quantity employed being such as to give a liquid medium, in which dispersed particles of boron of the size specified above will have a relatively low settling rate, i. e. the majority of such particles will remain suspended for several hours. In such a liquid medium boron particles may be maintained in suspension for several weeks if the medium containing the particles is subjected to slow continuous stirring, for example by a stirrer making approximately one revolution per second.

Cellulose derivatives which may be employed according to the invention are cellulose esters, for example cellulose nitrate and cellulose acetate, or alkyl ether celluloses, for example ethyl cellulose. The preferred cellulose derivative is cellulose nitrate in the form known as collodion, i. e. a cellulose nitrate soluble in ether-alcohol, a preferred amount of it being 5 per cent. of the composition.

Usual solvents for the cellulose derivative chosen may be employed, for example lower aliphatic alcohols, ketones, ethers and mixtures thereof, but preferred solvents are acetone, methyl alcohol and a mixture of diethyl ether and ethyl alcohol.

Other dispersing agents may be employed in small quantity in addition to a cellulose derivative, for example tannic acid.

Suspensions of boron for use according to the invention may be prepared by stirring amorphous boron into a solution of a cellulose derivative, preferably collodion, which may contain a small amount of tannic acid. Alternatively the boron may be preliminarily milled or triturated in the presence of a cellulose derivative and a small portion of a solvent thereof, and the resulting composition mixed with a further quantity of solvent to produce the desired suspension. With suspensions prepared as described above, coatings of boron may be obtained by application of a potential of about 60 volts in the case of collodion and tannic acid in methanol, the surface to be coated being made the anode. Operating at a temperature of substantially 38° C. has been found to result in smooth deposits of boron of good quality. Control of thickness of coating may be effected by control of time of treatment; thus films of boron in the irridescent range have been obtained by 10 seconds' treatment. Several depositions may be effected with drying of the coating between each deposition.

The following is an example of a preferred way of carrying the invention into effect as supplied by way of example to the coating of a copper cylinder.

Example

A 10 per cent suspension of amorphous boron in methyl alcohol, in which has been dissolved one per cent tannic acid and 5 per cent collodion (dissolved in acetone), is prepared by adding the required amount of boron to the methyl alcohol solution while stirring the mixture to disperse the boron. The copper cylinder, after undergoing degreasing and cleaning treatment, is immersed in the suspension maintained at substantially 38° C., together with a copper or steel electrode to serve as cathode. A potential of 60 volts is applied across the cylinder and cathode for 10 minutes and the cylinder is withdrawn, dried and heated. A finished coating so deposited was adherent.

In the specification all quantities specified are per cent. by weight.

I claim:

1. A substantially anhydrous fluid composition for the cataphoretic deposition of boron comprising finely divided boron in suspension in a medium comprising a compound of the group consisting of cellulose ethers and esters and an organic solvent therefor, the boron content being from 2 to 20 per cent of the composition and the content of cellulose compound being from 0.5 to 10 per cent of the composition.

2. A substantially anhydrous fluid composition for the cataphoretic deposition of boron comprising a 10 per cent suspension of finely divided boron in methanol containing substantially 5 per cent collodion and substantially 1 per cent tannic acid.

3. A fluid composition according to claim 2 wherein the boron is at least largely of particle size up to 10 microns.

4. A fluid composition according to claim 1 wherein the solvent is acetone.

5. A method of depositing boron cataphoretically upon an electrically conducting surface, which comprises applying a unidirectional electrical potential across an anode consisting of said surface and a cathode through a suspension of finely divided boron in a substantially anhydrous medium comprising a compound of the group consisting of cellulose esters and cellulose ethers as a dispersion agent for the boron, and an organic solvent for the said cellulose compound.

6. A method of depositing boron cataphoretically upon an electrically conducting surface, which comprises applying a unidirectional electrical potential across an anode consisting of said surface and a cathode through a suspension of finely divided particles of boron in a substantially anhydrous medium comprising collodion as a dispersion agent for the boron, and an organic solvent for the said collodion.

7. A method of depositing boron cataphoretically upon an electrically conducting surface, which comprises applying a unidirectional electric potential across an anode consisting of said surface and a cathode through a suspension of finely divided boron in a substantially anhydrous medium comprising collodion and tannic acid, and an organic solvent therefor at substantially 38° C., the boron constituting from 2 to 20 per cent, the collodion 0.5 to 10 per cent and the tannic acid substantially 1 per cent of the suspension.

8. A method of depositing a coating of boron on an electrically conducting surface, which comprises applying a unidirectional electric potential across an anode consisting of said surface and a cathode through a suspension of finely divided boron in a substantially anhydrous medium containing a compound of the group consisting of cellulose esters and ethers, and an organic solvent therefor, the boron being present in a quantity of 2 to 20 per cent and the cellulose compound in quantity from 0.5 to 10 per cent of the suspension.

9. A method of depositing a coating of boron on an electrically conducting surface, which comprises applying a unidirectional electric potential across an anode consisting of said surface and a cathode through a 10% suspension of finely divided boron in a substantially anhydrous medium consisting of methanol in which is dissolved substantially 1 per cent tannic acid and 5 per cent collodion, the deposition being effected at substantially 38° C.

10. A method according to claim 7 wherein the solvent is acetone.

11. A method according to claim 7 wherein the solvent is a mixture of ethyl alcohol and diethyl ether.

12. A composition according to claim 1 wherein the solvent is methyl alcohol.

13. A composition according to claim 1 wherein the solvent is a mixture of diethyl ether and ethyl alcohol.

14. A method according to claim 5 wherein the finely divided boron is at least largely of particle size up to 10 microns.

15. A method according to claim 5 wherein the finely divided boron is present in quantity from 2 to 20 per cent of the total suspension.

16. A method according to claim 6 wherein the finely divided boron is at least largely of particle size up to 10 microns.

17. A method according to claim 6 wherein the finely divided boron is present in quantity from 2 to 20 per cent of the total suspension.

18. A method according to claim 7 wherein the solvent is methanol.

19. A method according to claim 7 wherein the boron is at least largely of particle size up to 10 microns.

20. A method according to claim 8 wherein the suspension is maintained at substantially 38° C. during the deposition of boron.

OLIVER FLINT.

REFERENCES CITED

The following references are of record in the file of this patent:

UNITED STATES PATENTS

| Number | Name | Date |
|---|---|---|
| 1,639,698 | Holborn | Aug. 23, 1927 |
| 2,321,439 | Verwey et al. | June 8, 1943 |
| 2,456,370 | Buck | Dec. 14, 1948 |
| 2,462,125 | Oakes | Feb. 22, 1949 |

OTHER REFERENCES

Keyes et al., Chemical Abstracts, vol. 24 (1930), p. 2954.

Laubengayer et al., Journal American Chemical Society, vol. 65 (1943), pp. 1924–31.